US011669999B2

(12) United States Patent
Guay et al.

(10) Patent No.: US 11,669,999 B2
(45) Date of Patent: Jun. 6, 2023

(54) TECHNIQUES FOR INFERRING THREE-DIMENSIONAL POSES FROM TWO-DIMENSIONAL IMAGES

(71) Applicants: DISNEY ENTERPRISES, INC., Burbank, CA (US); ETH Zürich (Eidgenössische Technische Hochschule Zürich), Zürich (CH)

(72) Inventors: Martin Guay, Zurich (CH); Maurizio Nitti, Zurich (CH); Jakob Joachim Buhmann, Zurich (CH); Dominik Tobias Borer, Zurich (CH)

(73) Assignees: DISNEY ENTERPRISES, INC., Burbank, CA (US); ETH ZÜRICH (EIDGENÖSSISCHE TECHNISCHE HOCHSCHULE ZÜRICH), Zürich (CH)

( * ) Notice: Subject to any disclaimer, the term of this patent is extended or adjusted under 35 U.S.C. 154(b) by 328 days.

(21) Appl. No.: 16/883,775

(22) Filed: May 26, 2020

(65) Prior Publication Data
US 2021/0374993 A1 Dec. 2, 2021

(51) Int. Cl.
G06T 7/73 (2017.01)
G06T 15/02 (2011.01)
(Continued)

(52) U.S. Cl.
CPC .............. G06T 7/75 (2017.01); G06N 3/08 (2013.01); G06N 20/00 (2019.01); G06T 15/02 (2013.01)

(58) Field of Classification Search
CPC . G06T 7/75; G06T 15/02; G06T 2207/10016; G06T 2207/10024;
(Continued)

(56) References Cited

U.S. PATENT DOCUMENTS

2017/0169620 A1\* 6/2017 Bleiweiss ............... G06V 20/64
2018/0047192 A1\* 2/2018 Kristal ............... G06Q 30/0643
(Continued)

OTHER PUBLICATIONS

Wang, et al.; Real-Time Hand-Tracking with a Color Glove; date unknown; 8 pages.
(Continued)

Primary Examiner — Nimesh Patel
(74) Attorney, Agent, or Firm — Artegis Law Group, LLP

(57) ABSTRACT

In various embodiments, a training application generates training items for three-dimensional (3D) pose estimation. The training application generates multiple posed 3D models based on multiple 3D poses and a 3D model of a person wearing a costume that is associated with multiple visual attributes. For each posed 3D model, the training application performs rendering operation(s) to generate synthetic image(s). For each synthetic image, the training application generates a training item based on the synthetic image and the 3D pose associated with the posed 3D model from which the synthetic image was rendered. The synthetic images are included in a synthetic training dataset that is tailored for training a machine-learning model to compute estimated 3D poses of persons from two-dimensional (2D) input images. Advantageously, the synthetic training dataset can be used to train the machine-learning model to accurately infer the orientations of persons across a wide range of environments.

18 Claims, 6 Drawing Sheets
(4 of 6 Drawing Sheet(s) Filed in Color)

(51) Int. Cl.
*G06N 20/00* (2019.01)
*G06N 3/08* (2023.01)

(58) Field of Classification Search
CPC . G06T 2207/20081; G06T 2207/20084; G06T 2207/30196; G06T 7/74; G06T 2207/30244; G06T 7/337; G06T 7/35; G06T 7/593; G06T 7/11; G06T 19/006; G06T 19/00; G06T 7/50; G06T 13/40; G06T 2210/16; G06T 7/70; G06T 15/10; G06T 7/55; G06T 7/97; G06N 3/08; G06N 20/00; G06N 3/0454; G06N 3/04; G06N 3/006; G06N 3/082; G06N 5/003; G06N 7/005; G06N 3/10; G06V 10/82; G06V 20/20; G06V 20/64; G06V 10/757; G06V 40/28; G06V 40/10; G06V 10/10; G06V 40/113; G06V 40/20; G06V 40/172; G06V 40/174; G06V 40/197; G06K 9/627; G06K 9/6256; G06K 9/6274; G06K 9/6271; G06K 9/6201; G06K 9/6218; G06K 9/6267
See application file for complete search history.

(56) References Cited

U.S. PATENT DOCUMENTS

| | | | |
|---|---|---|---|
| 2018/0181802 A1* | 6/2018 | Chen | G06V 10/454 |
| 2019/0043269 A1* | 2/2019 | Lin | G06T 7/62 |
| 2019/0287301 A1* | 9/2019 | Colbert | G06K 9/6256 |

OTHER PUBLICATIONS

Xu, et al.; DenseRaC: Joint 3D Pose and Shape Estimation by Dense Render-and-Compare; dated Oct. 9, 2019; 11 pages. https://www.youtube.com/watch?v=vQXQXI2wNCE&feature=youtu.be.

* cited by examiner

TECHNIQUES FOR INFERRING THREE-DIMENSIONAL POSES FROM TWO-DIMENSIONAL IMAGES

BACKGROUND

Field of the Various Embodiments

The various embodiments relate generally to computer science and computer vision and, more specifically, to techniques for inferring three-dimensional poses from two-dimensional images.

Description of the Related Art

Computer vision techniques are oftentimes used to understand and track the spatial positions and movements of people for a wide variety of tasks. Some examples of such tasks include, without limitation, creating animated content, replacing actors with digital doubles, controlling games, analyzing gait abnormalities in medical practices, analyzing player movements in team sports, interacting with users in an augmented reality environment, etc. In one particularly useful computer vision technique known as three-dimensional ("3D") human pose estimation, the 3D pose of a person is automatically estimated based on a two-dimensional ("2D") image or video of the person acquired from a single camera. As used herein, the 3D pose of a person is defined to be a set of 3D positions associated with a set of joints that delineates a skeleton of the person, where the positions and orientations of bones included in the skeleton indicate the positions and orientations of the body parts of the person.

In one approach to 3D human pose estimation, a deep neural network is trained to estimate the 3D pose of a person depicted in a 2D image using training images that depict people oriented in various 3D poses. When an input image depicting a person is input into the trained neural network, the trained neural network infers body part assignments to generate an estimated 3D pose of the person. One drawback of this approach, however, is that the resolution of each training image is limited because of the memory limitations associated with typical graphics processing units. The use of lower-resolution training images can result in the loss of small-scale details during training. Accordingly, during training, the neural network may not learn how to use small-scale details to differentiate between the left and right of a person and/or between the front and back of a person when the orientation of the person is otherwise ambiguous. For example, unlike a human brain, when a face of a person is obscured or missing from an image, a typical trained neural network cannot use other context clues, for example, the presence of buttons on a shirt to determine that a portion of the visible torso is the chest of the depicted person.

In situations where the trained neural network cannot unambiguously infer the orientation of the depicted person, the trained neural network can inadvertently flip body parts when generating the estimated 3D pose. For example, the trained neural network could inaccurately map the left femur and the right femur of the depicted person to the right femur and the left femur, respectively, of the estimated 3D pose. Some existing post-processing techniques attempt to reduce the number of flips in a sequence of estimated 3D poses based on an assumption that the first estimated 3D pose in the sequence is correct. However, because none of the estimated 3D poses generated by the trained neural network is guaranteed to be correct, applying these types of post-processing techniques to such a sequence of estimated 3D poses does not necessarily reduce, and can even increase, the number of flips in the sequence.

In general, other existing approaches to 3D human pose estimation suffer from drawbacks similar to those discussed above and/or can be subject to other limitations. For example, in "marker-based" approaches to 3D human pose estimation, the 3D pose of a person wearing specialized hardware that includes multiple markers is computed based on input data acquired from tens or hundreds of cameras in a constrained and calibrated environment. One drawback of marker-based approaches is that the input data has to be acquired within the constrained and calibrated environment. Thus, determining the 3D pose of a person on a beach, for example, would not be possible with a marker-based approach. In another example, a multi-colored glove can be used to distinguish between various parts of a human hand, where an input image of a gloved hand is compared to reference images of the gloved hand in various hand poses to determine the best matching reference image and associated hand pose. One drawback of this type of approach is that the large number of reference images and associated comparison operations required to generalize to different hands or to expand the scope to human pose estimation would result in impracticable levels of both processing and time.

As the foregoing illustrates, what is needed in the art are more effective techniques for estimating 3D poses of people from 2D images

SUMMARY

One embodiment of the present invention sets forth a computer-implemented method for generating training items for three-dimensional (3D) pose estimation. The method includes generating multiple posed 3D models based on multiple 3D poses and a 3D model of a first person wearing a first costume associated with multiple visual attributes; for each posed 3D model, performing at least one rendering operation to generate at least one synthetic image; and for each synthetic image, generating a training item to include in a synthetic training dataset based on the synthetic image and the 3D pose associated with a posed 3D model from which the synthetic image was rendered, where the synthetic training dataset is tailored for training a machine-learning model to compute estimated 3D poses of persons from two-dimensional (2D) input images.

At least one technical advantage of the disclosed techniques relative to the prior art is that, with the disclosed techniques, the orientation of a person can be more accurately inferred across a wide range of environments. In that regard, because the pose estimation model generated by the disclosed techniques can accurately determine the orientation of a costumed person based only on the costume, the total number of body parts that are flipped in the estimated 3D pose can be reduced relative to prior-art techniques. Further, with the disclosed techniques, because environmental conditions can be automatically varied across synthetic images, the disclosed techniques can accurately estimate 3D poses of people across different types of environments. These technical advantages provide one or more technological improvements over prior art approaches.

BRIEF DESCRIPTION OF THE DRAWINGS

The patent or application file contains at least one drawing executed in color. Copies of this patent or patent application publication with color drawings will be provided by the Office upon request and payment of the necessary fee.

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
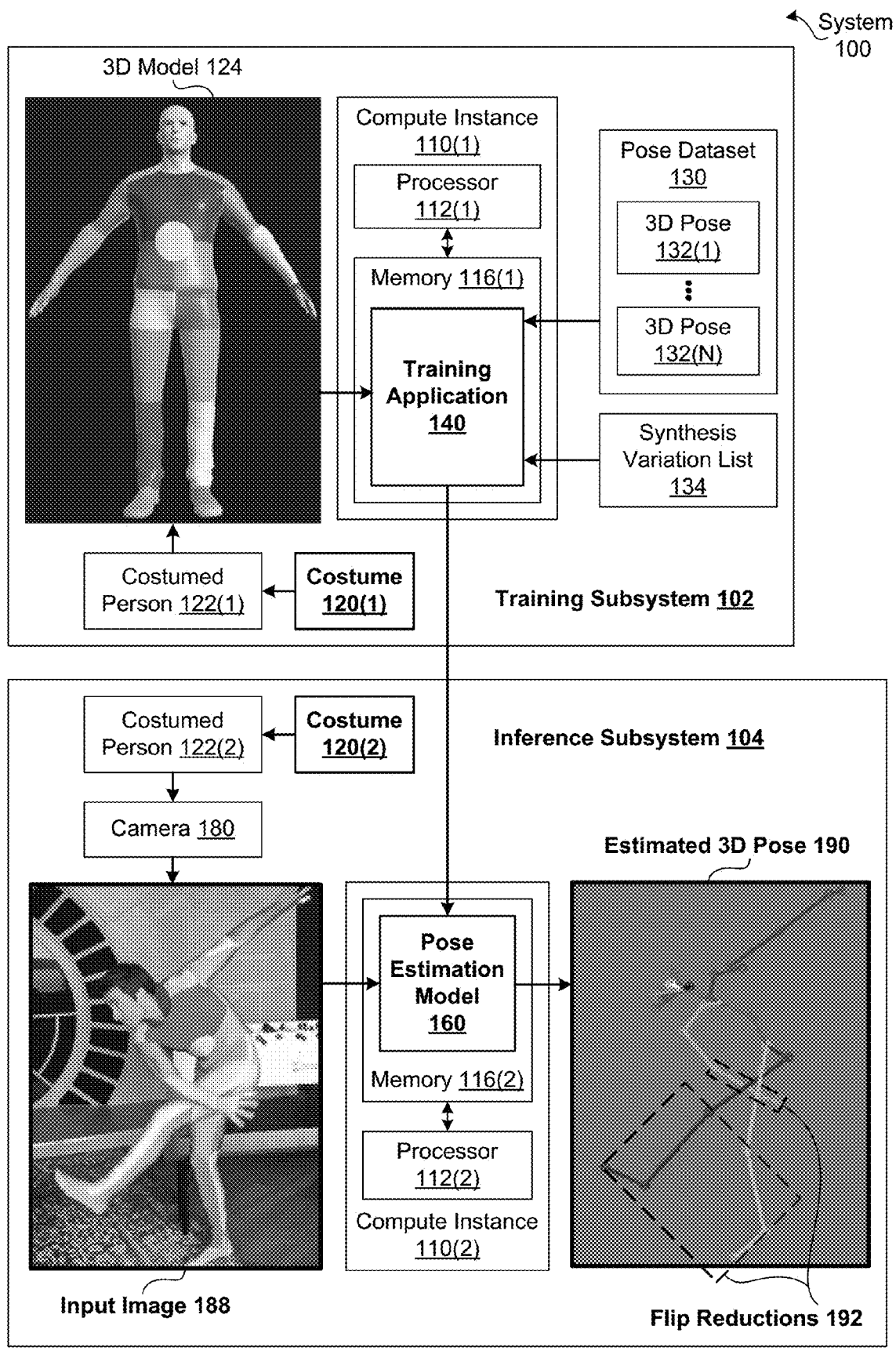
FIG. 1 is a conceptual illustration of a system configured to implement one or more aspects of the various embodiments.

FIG. 1 is a conceptual illustration of a system 100 configured to implement one or more aspects of the various embodiments. For explanatory purposes, multiple instances of like objects are denoted with reference numbers identifying the object and parenthetical alphanumeric character(s) identifying the instance where needed.

As shown, the system 100 includes, without limitation, a training subsystem 102 and an inference subsystem 104. The components of the training subsystem 102 and the inference subsystem 104 can be distributed across any number of shared geographic locations and/or any number of different geographic locations and/or implemented in one or more cloud computing environments (i.e., encapsulated shared resources, software, data, etc.) in any combination. In some alternate embodiments, the system 100 includes, without limitation, multiple inference subsystems 104.

The training subsystem 102 and the inference subsystem 104 include, without limitation, compute instances 110(1) and 110(2) (hereinafter "compute instance(s) 110"), respectively. In alternate embodiments, each of the training subsystem 102 and the inference subsystem 104 can include any number of compute instances 110. In the same or other alternate embodiments, each of the compute instances 110 may be implemented in a cloud computing environment, implemented as part of any other distributed computing environment, or implemented in a stand-alone fashion.

As shown, the compute instance 110(1) includes, without limitation, a processor 112(1) and a memory 116(1), and the compute instance 110(2) includes, without limitation, a processor 112(2) and a memory 116(2). The processors 112(1) and 112(2) are also referred to herein individually as "the processor 112" and collectively as "the processors 112." The memories 116(1) and 116(2) are also referred to herein individually as "the memory 116" and collectively as "the memories 116."

The processor 112 may be any instruction execution system, apparatus, or device capable of executing instructions. For example, the processor 112 could comprise a central processing unit, a graphics processing unit, a controller, a micro-controller, a state machine, or any combination thereof. The memory 116 of the compute instance 110 stores content, such as software applications and data, for use by the processor 112 of the compute instance 110. In some alternate embodiments, each of any number of compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory, such as random-access memory, read only memory, floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory, an optical storage device, a magnetic storage device, or any suitable combination of the foregoing.

In general, each of the compute instances 110 is configured to implement one or more applications or subsystems of applications. For explanatory purposes only, each application is described as residing in the memory 116 of a single compute instance 110 and executing on a processor 112 of the single compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instances 110 are configured to implement 3D human pose estimation. As described in detail previously herein, in one prior-art approach to 3D human pose estimation, a deep neural network is trained to estimate the 3D pose of a person depicted in a 2D image using training images that depict people oriented in various 3D poses. When an input image depicting a person is input into the trained neural network, the trained neural network infers body part assignments to estimate the 3D pose of the person. One drawback of this approach is that, because of the memory limitations associated with typical graphics processing units, small-scale details can be lost during training. As a result, the neural network may not learn how to use small-scale details to differentiate between the left and right of a person and between the front and back of a person when the orientation of the person is otherwise ambiguous. In situations where the trained neural network cannot unambiguously infer the orientation of the depicted person, the trained neural network can inadvertently flip body parts when estimating the 3D pose of the person. As also described previously herein, other existing approaches to 3D human pose estimation suffer from similar inaccuracies and/or are subject to other limitations, such as requiring that input images are acquired in a constrained and calibrated environment.

Disambiguating Orientation Based on a Wearable Costume

To address the above problems, the training subsystem 102 includes, without limitation, a costume 120(1) configured to be worn by a costumed person 122(1), a 3D model 124, the compute instance 110(1), a pose dataset 130, and a synthesis variation list 134. The costumed person 122(1) is a person that is wearing the costume 120(1). As described in greater detail in conjunction with FIGS. 3A-5, the costume 120(1) includes, without limitation, any number and/or types of wearable objects (e.g., pants, suit, etc.) that are each characterized by any number and/or types of visual attributes in any combination. Some examples of visual attributes include, without limitation, colors, patterns, and textures. When worn by a person, the visual attributes associated with the costume 120(1) visually differentiate between at least two body parts of the person.

The 3D model 124 is a digital representation of the costumed person 122(1). The training subsystem 102 may acquire the 3D model 124 in any technically feasible fashion. For instance, in some embodiments, the training subsystem 102 configures a 3D computer animation software tool to generate the 3D model 124 based on multiple red green blue ("RGB") images of the costumed person 122(1) that are captured by a still camera or a video camera. In alternate embodiments, the 3D model 124 is a digital representation of a virtual person wearing the costume 120(1).

Figure 3C:
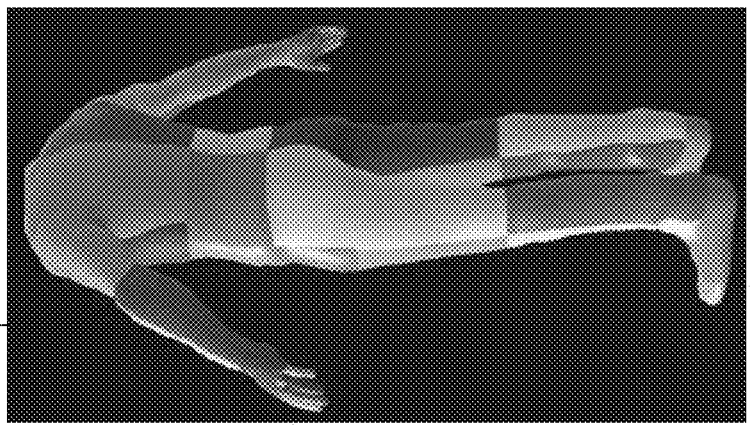
FIG. 3C is another profile view of the costume of FIG. 3A, according to various embodiments.
Figure 3B:
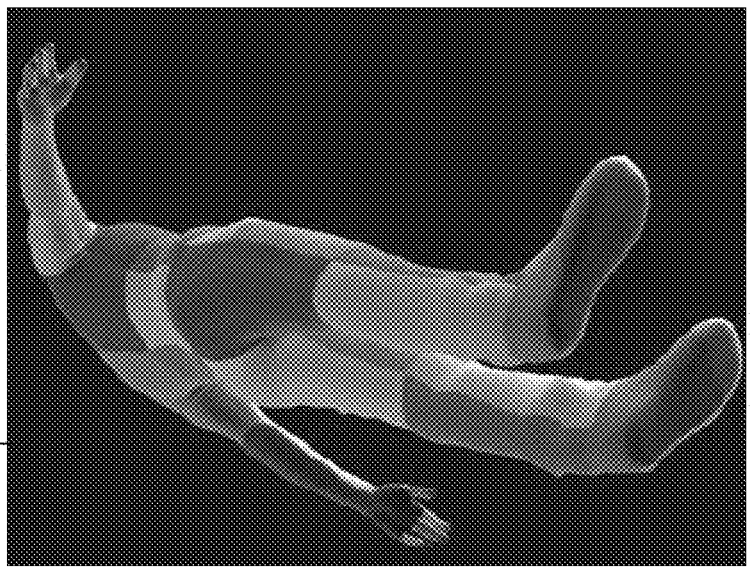
FIG. 3B is a profile view of the costume of FIG. 3A, according to various embodiments.
Figure 3A:
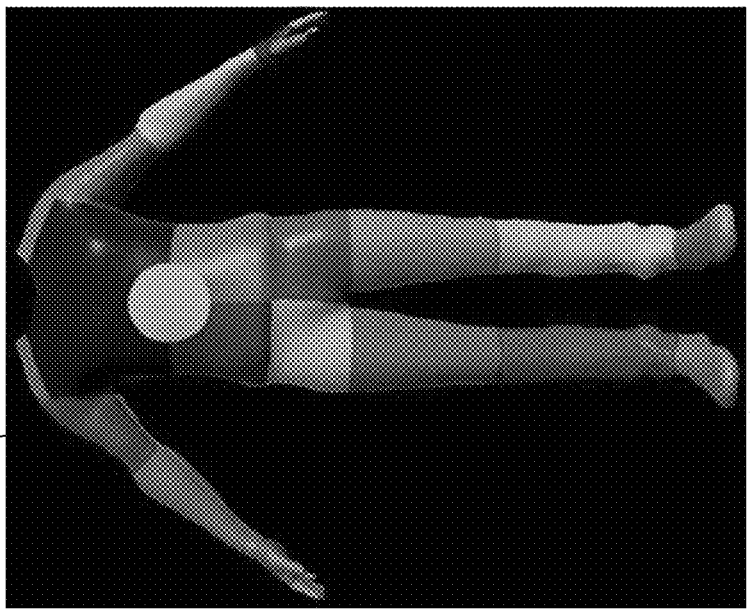
FIG. 3A is a front view of the costume of FIG. 1, according to various embodiments.

As illustrated by the 3D model 124 of FIG. 1, in some embodiments, the costume 120(1) is a multi-colored full suit. As referred to herein, a "full suit" covers the entire body except for the head, neck, and face of the costumed person 122(1). Notably, the colors of the costume 120(1) unambiguously differentiate between the left body parts and the right body parts of the costumed person 122(1). For example, the colors blue and orange differentiate between an upper portion of the right arm and an upper portion of the left arm. Although only the front of the 3D model 124 is visible in FIG. 1, the colors of the costume 120(1) also unambiguously differentiate between the front body parts and the back body parts of the costumed person 122(1). Additional views of the costume 120(1) are depicted in FIGS. 3A-3C.

As shown, a training application 140 resides in the memory 116(1) of the compute instance 110(1) and executes on the processor 112(1) of the compute instance 110(1). In a training phase, the training application 140 generates a synthetic training dataset (not shown in FIG. 1) based on the 3D model 124, the pose dataset 130, and the synthesis variation list 134. Note that the training application 140, the pose dataset 130, and the synthesis variation list 134 are described briefly in conjunction with FIG. 1 and in greater detail in conjunction with FIG. 2.

The pose dataset 130 includes, without limitation, 3D poses 132(1)-132(N) (hereinafter "3D pose(s) 132"), where N is any integer greater than one. Each of the 3D poses 132 represents a human body pose and specifies explicitly or implicitly, in any technically feasible fashion, and without limitation, a set of 3D positions associated with a set of joints. In some embodiments, each joint corresponds to a different physical joint in the human skeleton. Some examples of physical joints are a neck joint, a head joint, a left shoulder joint, a right shoulder joint, a left thumb joint, a right thumb joint, a left hip joint, a right hip joint, a left knee joint, a right knee joint, a left foot joint, a right foot joint, etc.

The 3D position of a joint may be specified in any technically feasible fashion. For instance, in some embodiments, the 3D position of a joint is specified as 3D coordinates (x, y, z) relative to an associated camera viewpoint. In some embodiments, each of the 3D poses 132 delineates a 3D skeleton that includes, without limitation, any number of bones. Each bone connects two of the joints, and the positions and orientations of the bones in the 3D skeleton indicate the positions and orientations of associated body parts.

The synthesis variation list 134 specifies, without limitation, any number and/or types of body shape variations and number and/or types of rendering variations in any technically feasible fashion. For instance, in some embodiments, the synthesis variation list 134 specifies any number of body shape modifications, any number of lightings, any number of camera viewpoints, any number of textures, or a combination thereof.

In some embodiments, the body shape modifications include, without limitation, any number and/or types of changes to the 3D model to generate various types of body shapes that are observed in the world. Some examples of body shape modifications include, without limitation, inflating, deflating, and/or changing the shapes of individual body parts, combinations of body parts, and/or all body parts in any combination. In some embodiments, inflating and/or deflating body part(s) includes, without limitation, changing the size, the length, the diameter, and/or the girth of the head, torso, chest, rear, stomach, back, any number of appendages (e.g., arms, the legs, fingers, etc.), and/or any number of other body parts in any combination. Some examples of changing the shapes of individual body parts include, without limitation, changing the curvature of the chin, changing the shape of the nose, changing the shape of one or both of the legs, etc. In some embodiments, the body shape modifications can be non-symmetric, for example the girth and the shape of the left leg could be changed to make the left leg "rounder," and the girth and the shape of the right leg could be change to make the right leg appear more "muscular."

In some embodiments, to generate the synthetic training dataset, the training application 140 applies body shape variations specified in the synthesis variation list 134 to the 3D model 124 to generate any number of modified 3D models (not shown). The training application 140 fits each of the 3D models 124 and the modified 3D models to each of the 3D poses 132(1)-132(N) to generate posed 3D models (not shown). The training application 140 renders each of the posed 3D models based on different combinations of the rendering variations specified in the synthesis variation list 134 to generate synthetic images. Importantly, each of the synthetic images depicts the costumed person 122(1) or a modified version of the costumed person 122(1) oriented in one of the 3D poses 132.

The training application 140 trains a machine-learning model (not shown) to learn a mapping from the synthetic images to the associated 3D poses 132. The machine-learning model can be any type of machine-learning model. For instance, in some embodiments, the machine-learning model is a neural network. The final trained version of the machine-learning model is referred to herein as a pose estimation model 160 and the "trained machine-learning model."

After the training phase is complete, the training application 140 transmits the pose estimation model 160 to the inference subsystem 104. In some alternate embodiments, the training application 140 stores the pose estimation model 160 in any number and/or types of memories or storage resources. In the same or other alternate embodiments, the training application 140 transmits the pose estimation model 160 to any number and/or types of subsystems and/or software applications.

The inference subsystem 104 includes, without limitation, the compute instance 110(2), a costume 120(2) configured to be worn by a costumed person 122(2), a camera 180, an input image 188, and an estimated 3D pose 190. During an inference phase, the pose estimation model 160 resides in the memory 116(2) of the compute instance 110(2) and executes on the processor 112(2) of the compute instance 110(2).

For explanatory purposes, the costumes 120(1) and 120(2) are also referred to herein as "the costume(s) 120." Further, the costumed person 122(1) and the costumed person 122(2) are also referred to herein as "the costumed person(s) 122." In some alternate embodiments, the training subsystem 102 and/or any number of inference subsystems 104 may each include any number of costumes 120 and any number of costumed persons 122.

Each of the costumes 120 is a different instance and/or version of the same wearable object(s), is characterized by the same visual attributes, and, when worn by a person, differentiates between the body parts of the person in the same manner. In some embodiments, each of the costumes 120 has the same layout but is scaled based on a different size and/or type of body. For instance, in some embodiments, the costume 120(2) is a smaller-sized version of the costume 120(1) and is therefore more suitable for smaller people. Each of the costumed persons 122 is a different person that is wearing one of the costumes 120. For instance, in some alternate embodiments, the costumed person 122(2) wears the costume 120(1) instead of the costume 120(2).

The camera 180 is a still camera and, as shown, generates the input image 188 that depicts the costumed person 122(2). The input image 188 is also referred to herein as the "2D input image 188." In some embodiments, the input image 188 is a red green blue ("RGB") image. In some alternate embodiments, the camera 180 is a video camera that generates a video sequence that depicts the costumed person 122(2), and the input image 188 is a frame of the video sequence.

As shown, the inference subsystem 104 inputs the input image 188 into the pose estimation model 160 and, in response, the pose estimation model 160 outputs the estimated 3D pose 190. The estimated 3D pose 190 is an estimate of the 3D pose of the costumed person 122(2) as depicted in the input image 188. The estimated 3D pose 190 specifies explicitly or implicitly, in any technically feasible fashion, and without limitation, a set of 3D positions associated with a set of joints. In some embodiments, the set of 3D positions estimates positions and orientations associated with a set of physical joints of the costumed person 122(2).

In some embodiments, the set of 3D positions specified via the estimated 3D pose 190 delineates a 3D skeleton of the costumed person 122(2), where the positions and orientations of any number of bones in the 3D skeleton indicate the positions and orientations of associated body parts of the costumed person 122(2). For explanatory purposes only, the estimated 3D pose 190 is depicted as a skeleton, each joint of the skeleton is depicted as a colored circle, and each bone of the skeleton is depicted as a colored line connecting two of the joints.

As persons skilled in the art will recognize, because each of the synthetic images depicts the costumed person 122(1) or a modified version of the costumed person 122(1), the pose estimation model 160 learns (during the training phase) to use the visual attributes associated with the costumes 120 to determine the proper orientation of the costumed persons 122. Furthermore, because of the variations in body shapes, the lightings, the camera viewpoints, and the textures across the synthetic images 278, the pose estimation model 160 learns (during the training phase) to generalize across different costumed persons 122 and across different environments.

As a result, relative to prior-art neural networks that are trained using 2D images of non-costumed persons, the number of flips can be reduced and therefore the accuracy of the pose estimation model 160 can be improved. As shown, the estimated 3D pose 190 matches the actual pose of the costumed person 122(2) as depicted in the input image 188. Furthermore, two dashed boxes depict flip reductions 192 relative to a prior-art neural network as per empirical results. More specifically, the prior-art neural network incorrectly infers that the lower right arm of the costumed person 122(2) is a lower left arm, the lower right leg of the costumed person 122(2) is a lower left leg, and the lower left leg of the costumed person 122(2) is a lower right leg.

For explanatory purposes only, the inference subsystem 104 and the pose estimation model 160 are depicted in the context of generating the estimated 3D pose 190 based on the input image 188. In some embodiments, however, the inference subsystem 104 sequentially inputs any number of input images 188 into the pose estimation model 160 and, in response, the pose estimation model 160 sequentially generates any number of estimated 3D poses 190. In alternate embodiments, the inference subsystem 104 includes, without limitation, multiple instances of the pose estimation model 160 that operate concurrently and independently.

Note that the techniques described herein are illustrative rather than restrictive and may be altered without departing from the broader spirit and scope of the invention. Many modifications and variations on the functionality provided by the training subsystem 102, the training application 140, the inference subsystem 104, and the pose estimation model 160 will be apparent to those of ordinary skill in the art without departing from the scope and spirit of the described embodiments.

It will be appreciated that the system 100 shown herein is illustrative and that variations and modifications are possible. For example, the functionality provided by the training application 140 and the pose estimation model 160 as described herein can be integrated into or distributed across any number of software applications (including one), and any number of components of the system 100. Further, the connection topology between the various components in FIG. 1 may be modified as desired.

Synthesizing a Training Dataset

Figure 2:
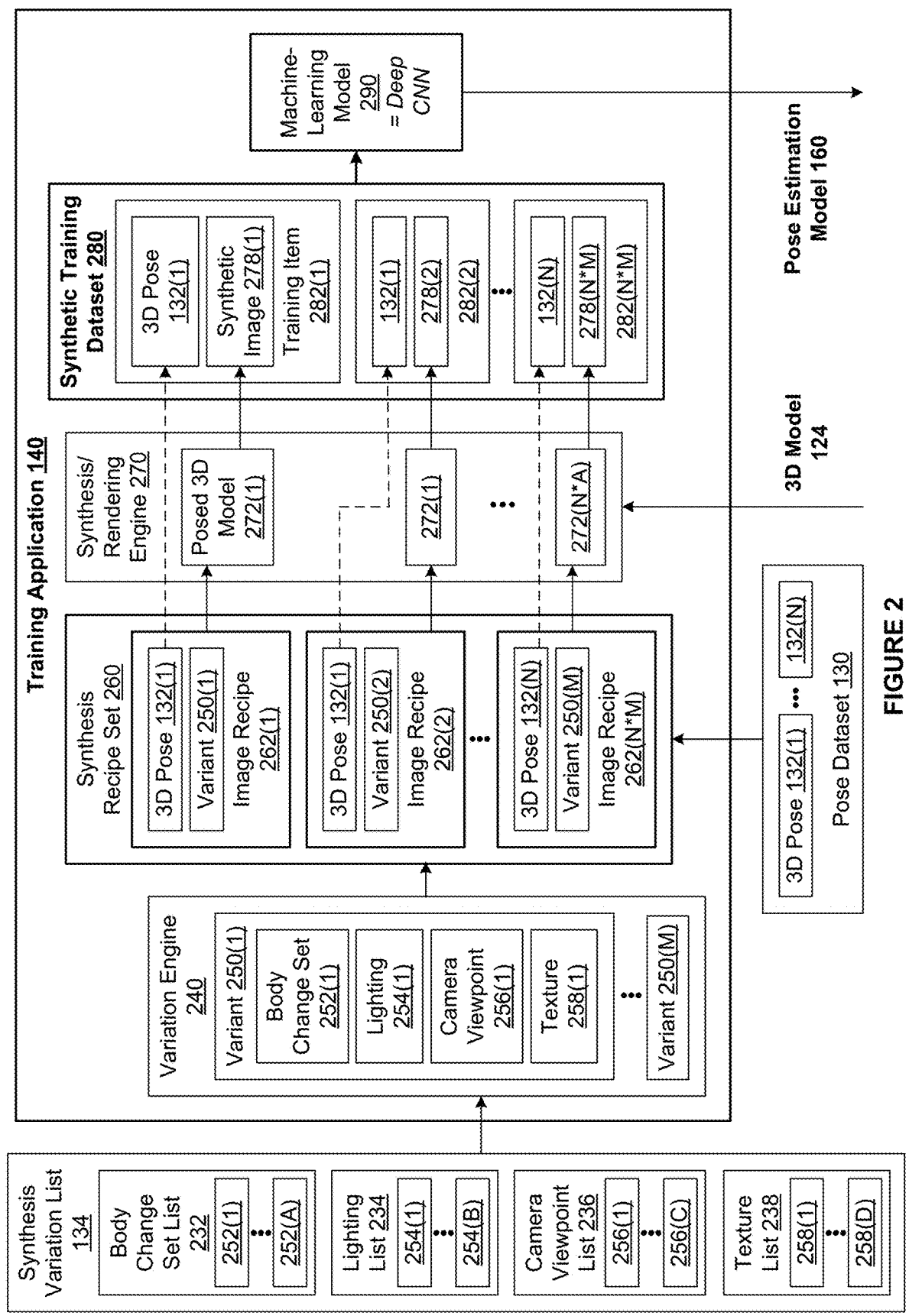
FIG. 2 is a more detailed illustration of the training application of FIG. 1, according to various embodiments.

FIG. 2 is a more detailed illustration of the training application 140 of FIG. 1, according to various embodiments. As described previously herein in conjunction with FIG. 1, the training application 140 generates the pose estimation model 160 based on the pose dataset 130, the synthesis variation list 134, and the 3D model 124. As shown, the training application 140 includes, without limitation, a variation engine 240, a synthesis recipe set 260, a synthesis/rendering engine 270, a synthetic training dataset 280, and a machine-learning model 290.

The variation engine 240 generates the synthesis recipe set 260 based on the pose dataset 130 and the synthesis variation list 134. As described previously herein in conjunction with FIG. 1, the pose dataset 130 includes, without limitation, the 3D poses 132(1)-132(N), where N is any integer greater than one. Each of the 3D poses 132(1)-132(N) specifies explicitly or implicitly and without limitation, a set of 3D positions for a set of joints in any technically feasible fashion. As shown, the synthesis variation list 134 includes, without limitation, a body change set list 232, a lighting list 234, a camera viewpoint list 236, and a texture list 238.

The body change set list 232 includes, without limitation, any number of body change sets 252(1)-252(A) (hereinafter "body change set(s) 252"), where A can be any integer, that are specified in any technically feasible fashion. Each of the body change sets 252 that is not empty, when applied to the 3D model 124, generates a modified 3D model (not shown) that represents a modified version of the costumed person 122(1) that is to be rendered.

Each modified version of the costumed person 122(1) is a different person (that may not actually exist) that is wearing the costume 120(1) or a different version of the costume 120(1). For example, the body change set 252(1) could specify actions that increase the length of the legs of the modeled person, increase the girth of the modeled person, decrease the size of the head of the modeled person, and so forth. An empty body change set 252 indicates that the 3D model is rendered without modification.

The lighting list 234 includes, without limitation, any number of lightings 254(1)-254(B) (hereinafter "lighting(s) 254"), where B can be any integer, that are specified in any technically feasible fashion. Each of the lightings 254 specifies, without limitation, any number and/or types of lighting sources, lighting effects, etc., that can be applied when performing any number and/or types of rendering operations.

The camera viewpoint list 236 includes, without limitation, any number of camera viewpoints 256(1)-256(C) (hereinafter "camera viewpoint(s) 256"), where C can be any integer, that are specified in any technically feasible fashion. Each of the camera viewpoints 256 specifies, without limitation, an apparent distance and an angle from which a single camera views and records objects (e.g., the 3D model 124) when performing any number and/or types of rendering operations.

The texture list 238 includes, without limitation, any number of textures 258(1)-258(D) (hereinafter "texture(s) 258"), where D can be any integer, that are specified in any technically feasible fashion. Each of the textures 258 can be applied when performing any number and/or types of rendering operations to impart any number and/or types of visual details to the surfaces of the rendered image.

As shown, the variation engine 240 includes, without limitation, variants 250(1)-250(M) (hereinafter "variant(s) 250"), where M is any integer greater than zero. The variation engine 240 generates the variants 250 based on different combinations of one of each of the body change sets 252, the lightings 254, the camera viewpoints 256, and the textures 258. Each of the variants 250 specifies, without limitation, environmental data specifying a different set of environmental condition(s) associated with any number and/or types of environments.

As shown, in some embodiments, the variant 250(1), includes, without limitation, the body change set 252(1), the lighting 254(1), the camera viewpoint 256(1), and the texture 258(1). In some embodiments, the body change sets 252 are also referred to as the body shape variations, and the lightings 254, the camera viewpoints 256, and the textures 258 are also referred to as the rendering variations.

The variation engine 240 may determine the unique combinations of one of each of the body change sets 252, the lightings 254, the camera viewpoints 256, and the textures 258 for assignment to the variants 250 in any technically feasible fashion. In some embodiments, the variation engine 240 exhaustively enumerates all unique combinations of one each of the body change sets 252, the lightings 254, the camera viewpoints 256, and the textures 258 to generate the variants 250. Advantageously, in the same or other embodiments, the variants 250 represent a wide range of people and environments.

As shown, the synthesis recipe set 260 includes, without limitation, image recipes 262(1)-262(N*M) (hereinafter "image recipe(s) 262"), where N is the total number of the 3D poses 132 and M is the total number of the variants 250. The variation engine 240 assigns a different combination of one of the 3D poses 132 and one of the variants 250 to each of the image recipes 262. More specifically, for each integer x from 1 to N, the variation engine 240 assigns the 3D pose 132(x) to each of the image recipes 262((M*(x−1)+1), M*x), and assigns the variants 250(1)-250(M) to the image recipes 262((M*(x−1)+1), M*x), respectively, The synthesis recipe set 260 therefore represents the N*M unique combinations of the 3D poses 132 and the variants 250.

For explanatory purposes, the image recipes 262(1), 262(2), and 262(N*M) are depicted in detail. As shown, the image recipe 262(1) includes, without limitation, the 3D pose 132(1) and the variant 250(1). The image recipe 262(2) includes, without limitation, the 3D pose 132(1) and the variant 250(2). And the image recipe 262(N*M) includes, without limitation, the 3D pose 132(N) and the variant 250(M).

The synthesis/rendering engine 270 generates the synthetic training dataset 280 based on the synthesis recipe set 260 and the 3D model 124. As described in detail in conjunction with FIG. 1, the 3D model 124 is a 3D representation of the costumed person 122(1) and is generated in any technically feasible fashion. As shown, the synthetic training dataset 280 includes, without limitation, training items 282(1)-282(N*M) (hereinafter "training item(s) 282"), where (N*M) is the total number of the image recipes 262.

The synthesis/rendering engine 270 generates the training items 282(1)-282(N*M) based on the image recipes 262(1)-262(N*M), respectively, and the 3D model 124. As described previously herein, the body change sets 252(1)-252(A) are represented across the image recipes 262(1)-262(N*M). For each of the body change sets 252(1)-252(A), the synthesis/rendering engine 270 applies the body change set 252 to the 3D model 124 to generate a different unposed 3D model (not shown). If the body change set 252 is empty, then the synthesis/rendering engine 270 sets the unposed 3D model equal to the 3D model 124. Otherwise, the synthesis/rendering engine 270 modifies at least one shape in the 3D model 124 to generate the unposed 3D model. The synthesis/rendering engine 270 can modify the 3D model 124 in any technically feasible fashion. For instance, in some embodiments, the synthesis/rendering engine 270 configures a game engine to modify the 3D model 124. Notably, each of the unposed 3D models represents either the costumed person 122(1) or a modified version of the costumed person 122(1).

The synthesis/rendering engine 270 fits each of the unposed 3D models to each of the 3D poses 132(1)-132(N) to generate posed 3D models 272(1)-272(N*A) (hereinafter "posed 3D model(s) 272"). More specifically, for each integer u from 1 to A, the synthesis/rendering engine 270 fits the $u^{th}$ unposed 3D model to each of the 3D poses 132(1)-132(N) to generate the posed 3D models 272((N*(u−1)+1), N*u). The posed 3D models 272 therefore represents the N*A unique combinations of the 3D poses 132 and the unposed 3D models. Further, each of the posed 3D models 272 is associated with a different combination of the body change sets 252 and the 3D poses 132.

The synthesis/rendering engine 270 can fit the $u^{th}$ unposed 3D model to a given 3D pose 132(v), where v is an integer from 1 to N, in any technically feasible fashion. For instance, in some embodiments, the synthesis/rendering engine 270 configures a game engine to fit the $u^{th}$ unposed 3D model to the 3D pose 132(v). As persons skilled in the art will recognize, the resulting posed 3D model 272(N*(u−1)+v) represents either the costumed person 122(1) oriented in the 3D pose 132(v) or a modified version of the costumed person 122(1) oriented in the 3D pose 132(v).

The synthesis/rendering engine 270 generates the training items 282(1)-282(N*M) based on the image recipes 262(1)-262(N*M), respectively, and the posed 3D models 272(1)-272(N*A). To generate the training item 282(z), where z is an integer from 1 to (N*M), the synthesis/rendering engine 270 selects the body change set 252, the lighting 254, the camera viewpoint 256, and the texture 258 specified via the variant 250 included in the image recipe 262(z). The synthesis/rendering engine 270 also selects the 3D pose 132 specified in the image recipe 262(z).

The synthesis/rendering engine 270 selects the posed 3D model 272 associated with both the selected body change set 252 and the selected 3D pose 132. As depicted, in some embodiments, for the image recipes 262(1), 262(2), and 282(N*M) the synthesis/rendering engine 270 selects the posed 3D models 272(1), 272(1), and 272(N*A), respectively. The synthesis/rendering engine 270 then renders the selected posed 3D model 272 based on the selected lighting 254, the selected camera viewpoint 256, and the selected texture 258 to generate a synthetic image 278(z).

The synthesis/rendering engine 270 may directly and/or indirectly perform any number and/or type of rendering operations in any technically feasible fashion to generate the synthetic image 278(z). For instance, in some embodiments, the synthesis/rendering engine 270 configures a game engine to render the selected posed 3D model 272 based on the selected lighting 254, the selected camera viewpoint 256, and the selected texture 258 to generate the synthetic image 278(z).

Subsequently, the synthesis/rendering engine 270 generates the training item 282(z) that includes, without limitation, the selected 3D pose 132 and the synthetic image 278(z). Importantly, the synthetic image 278(z) is a 2D image of either the costumed person 122(1) oriented in the selected 3D pose 132 or a modified version of the costumed person 122(1) oriented in the selected 3D pose 132. Therefore, the selected 3D pose 132 is ground truth data for performing human pose estimation based on the synthetic image 278(z).

The synthetic training dataset 280 includes, without limitation, M training items 282 for each of the 3D poses 132(1)-132(N). Further, the synthetic training dataset 280 includes, via the training items 282, the synthetic images 278(1)-278(N*M). For explanatory purposes, the training items 282(1), 282(2), and 282(N*M) are depicted in detail. As shown, the training item 282(1) includes, without limitation, the synthetic image 278(1) and the 3D pose 132(1). The training item 282(2) includes, without limitation, the synthetic image 278(2) and the 3D pose 132(1). And the training item 282(N*M) includes, without limitation, the synthetic image 278(N*M) and the 3D pose 132(N).

In some embodiments, the synthetic training dataset 280 represents a variety of persons in a wide range of poses across a variety of conditions (e.g., lighting conditions, camera distances, camera angles, surface details) that are representative of a wide range of environments. In some alternate embodiments, any number of the techniques and/or components described herein are modified to ensure that the synthetic training dataset 280 represents variations of any number and/or types of depicted objects (e.g., the costumed person 122(1)) and/or environmental conditions in any technically feasible fashion.

For instance, in some alternate embodiments, the synthesis variation list 134 specifies any number and/or types of modifications that can be applied to the 3D model 124 and/or when performing any number and/or types rendering operations in any technically feasible fashion instead of or in addition to any number of the body change set list 232, the lighting list 234, the camera viewpoint list 236, or the texture list 238. In the same or other alternate embodiments, each of the variants 250 specifies any number and/or types of modifications that can be applied to the 3D model 124 and/or when performing any number and/or types rendering operations in any technically feasible fashion instead of or in addition to any number of the body change set 252, the lighting 254, the camera viewpoint 256, or the texture 258.

In some alternate embodiments, the training application 140 generates the synthetic training dataset 280 in any technically feasible fashion based on the 3D model 124 and any number of 3D poses 132. In the same or other alternate embodiments, the training application 140 ensures that the synthetic training dataset 280 represents variations in any number and/or types of depicted objects (e.g., the costumed person 122) and/or conditions in any technically feasible fashion. For instance, in some alternate embodiments, the training application 140 directly and/or indirectly performs any number of domain randomization operations to create variations in body shape, lighting, camera viewpoint, and texture across the synthetic images 278 and therefore across the synthetic training dataset 280.

The training application 140 performs any amount and/or types of training operations on the machine-learning model 290 based on the synthetic training dataset 280 to generate the pose estimation model 160. The pose estimation model 160 is the final trained version of the machine-learning model 290 that exists after the training application 140 has finished performing the training operations. The training operation(s) are also referred to herein as "machine-learning operation(s)." The machine-learning model 290 can be any type of machine-learning model. As depicted in italics, in some embodiments, the machine-learning model 290 is a deep convolutional neural network ("CNN").

During the training phase, the training application 140 trains the machine-learning model 290 to learn a mapping from the synthetic images 278(1)-278(N*M) to the 3D poses 132 included in the training items 282(1)-282(N*M), respectively. In some embodiments, each of the 3D poses 132 specifies a different set of 3D positions for a set of joints and each set of 3D positions is also referred to herein as "3D pose labels." In such embodiments, the machine-learning model 290 learns to map the synthetic images 278(1)-278 (N*M) to the 3D pose labels associated with the training items 282(1)-282(N*M), respectively.

As persons skilled in the art will recognize, training the machine-learning model 290 based on the synthetic training dataset 280 effectively compresses the synthetic training dataset 280. Therefore, in contrast to prior-art techniques that involve comparing the input image 188 to each of numerous reference images, the pose estimation model 160 can efficiently infer the estimated 3D pose 190 from the input image 188 irrespective of the total number of the synthetic images 278. In some embodiments, the pose estimation model 160 infers the estimated 3D pose 190 from the input image 188 in real-time.

Because the synthetic images 278 depict costumed persons 122 oriented in the 3D poses 132(1)-132(N), the machine-learning model 290 learns to use the visual attributes of the costume 120 to determine the orientation of a person wearing the costume 120 when the orientation of the person is otherwise ambiguous. More specifically, the machine-learning model 290 learns to use the visual attributes of the costume 120 to differentiate between the left and right of a person wearing the costume 120 and between the front and back of a person wearing the costume 120.

Furthermore, because of the variations in body shapes, the lighting 254, the camera viewpoint 256, and the texture 258 across the synthetic images 278, the machine-learning model 290 learns to generalize across different costumed persons 122 and across different types of environments. Relative to prior-art neural networks that are trained using images of non-costumed persons, the accuracy of the pose estimation model 160 is therefore improved for people having a variety of body shapes across different types of environments. In particular, the number of flips in the estimated 3D poses 190 generated by the pose estimation model 160 can be reduced.

In some alternate embodiments, the machine-learning model 290 is a composite model that includes, without limitation, any number and/or types of machine-learning models, any number and/or types of other models, and/or any number and/or types of algorithms in any combination. For instance, in some alternate embodiments, the machine-learning model 290 includes, without limitation, a CNN and a label application that generates a different set of 3D pose labels for each of the 3D poses 132. During the training phase, for each of the training items 282, the CNN learns to infer the associated set of 3D pose labels based on the associated synthetic image 278. During the inference phase, the pose estimation model 160 inputs the input image 188 into the CNN and the label application generates the estimated 3D pose 190 based on the set of 3D pose labels generated by the CNN.

Referring back to FIG. 1, after the training phase is complete, the training application 140 transmits the pose estimation model 160 to the inference subsystem 104. In some embodiments, the pose estimation model 160 refers to the combination of the machine-learning model 290 and the final values of any number of parameters (e.g., weights and biases) included in the machine-learning model 290. In some such embodiments, the training application 140 transmits the final values of the parameters instead of the pose estimation model 160 to the inference subsystem 104.

In some alternate embodiments, the machine-learning model 290 and a portion of the functionality of the training application 140 are included in a separate "machine-learning application" instead of the training application 140. The training application 140 generates the synthetic training dataset 280 as described above and then stores the synthetic training dataset 280 in a memory or storage resource accessible to the machine-learning application and/or transmits the synthetic training dataset 280 to the machine-learning application. The machine-learning application trains the machine-learning model 290 based on the synthetic training dataset 280 in any technically feasible fashion to generate the pose estimation model 160. In some alternate embodiments, the machine-learning application resides in a memory 116(3) of the compute instance 110(3) (not shown) and executes on the processor 112(3) of the compute instance 110(3).

FIG. 3A is a front view of the costume 120(1) of FIG. 1, according to various embodiments. FIG. 3B is a profile view of the costume 120(1) of FIG. 3A, according to various embodiments. FIG. 3C is another profile view of the costume 120(1) of FIG. 3A, according to various embodiments. As shown in FIGS. 3A-3C, the costume 120(1) is multi-colored full suit for which the colors unambiguously differentiate between front body parts and back body parts and between left body parts and right body parts.

For example, the colors dark green, brown, purple, and blue differentiate between an upper-right portion of the chest, an upper-left portion of the chest, an upper-right portion of the back, and an upper-left portion of the back. In another example, the colors periwinkle and bright green differentiate between a top portion of the right foot and a top portion of the left foot.

In alternate embodiments, the costume 120(1) is characterized by any number and/or types of visual attributes. Some examples of visual attributes include, without limitation, colors, patterns, and textures. When worn by a person, the visual attributes associated with the costume 120(1) visually differentiate between at least two body parts of the person.

For instance, in some alternate embodiments, the costume 120(1) is a multi-patterned full suit (not shown) for which the patterns distinguish between different body parts. The coloring of the multi-patterned full suit is for aesthetic purposes only. In other alternate embodiments, the costume 120(1) is a multi-colored, multi-patterned full suit (not shown) for which both the colors and the patterns distinguish between different body parts. In yet other embodiments, the costume 120(1) is a multi-textured full suit for which the textures distinguish between different body parts.

In some alternate embodiments, the costume 120(1) includes, without limitation, any number and/or types of wearable objects, where each of the wearable objects is characterized by any number and/or types of visual attributes. In the same or other alternate embodiments, the costume 120(1) covers fewer body parts than the multi-colored full suit. In some alternate embodiments, the costume 120(1) covers only a left portion of the body or only a right portion of the body. In the same or other alternate embodiments, the costume 120(1) covers only an upper portion of the body or only a lower portion of the body In some alternate embodiments, the visual attributes of the costume 120(1) explicitly distinguish between a subset of left body parts and a subset of right body parts but do not explicitly distinguish between front body parts and back body parts. In other alternate embodiments, the visual attributes of the costume 120(1) explicitly distinguish between a subset of front body parts and a subset of back body parts but do not explicitly distinguish between left body parts and right body parts.

Figure 4:
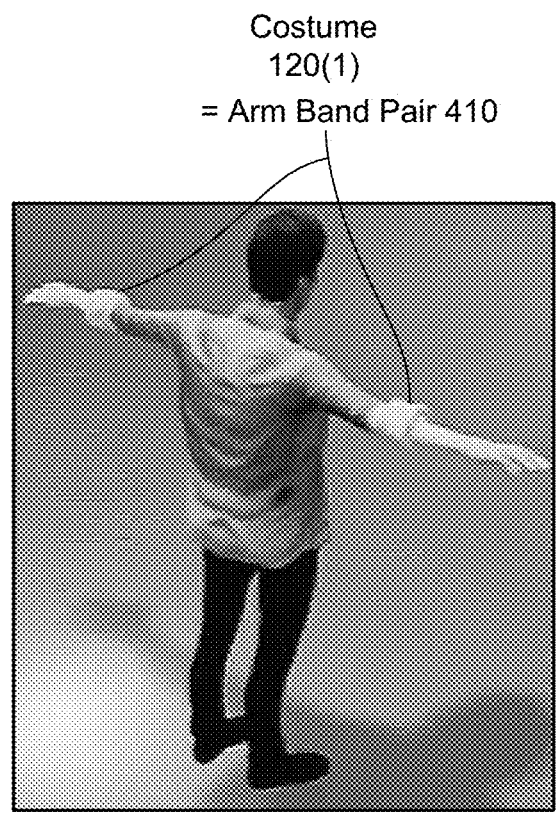
FIG. 4 is an example of the costume of FIG. 1, according to various embodiments.

FIG. 4 is an example of the costume 120(1) of FIG. 1, according to various embodiments. As shown, the costume 120(1) includes, without limitation, the arm band pair 410. The costume 120(1) covers fewer body parts than the multi-colored full suit. The arm band pair 410 includes two arm bands, where each arm band is a wearable object that each encircles a portion of a different arm. The arm band pair 410, when visible, explicitly distinguishes between a portion of the left arm and a portion of the right arm and therefore defines the orientation of a person wearing the costume 120(1). The orientation defines the subsets of the other body parts that are left body parts, right body parts, front body parts, and back body parts.

In some alternate embodiments, the costume 120(1) includes, without limitation, the arm band pair 410 and any number of other wearable objects in any combination. In the same or other alternate embodiments, the costume 120(1) includes, without limitation, one arm band and any number of other wearable objects in any combination. For instance, in some alternate embodiments, the costume 120(1) includes two wearable objects, the left arm band and a right glove (not shown).

Figure 5:
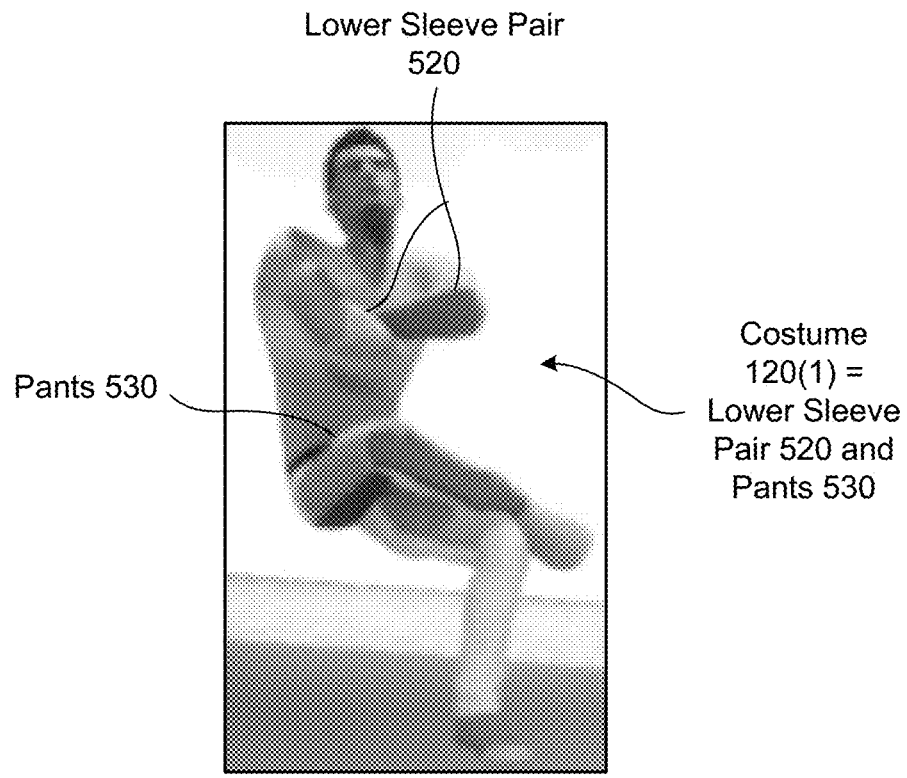
FIG. 5 is an example of the costume of FIG. 1, according to various embodiments.

FIG. 5 is an example of the costume 120(1) of FIG. 1, according to various embodiments. As shown, the costume 120(1) includes, without limitation, the lower sleeve pair 520 and the pants 530. The lower sleeve pair 520 includes two lower sleeves, where each lower sleeve is a wearable object that each covers a different arm from the elbow to the wrist and does not cover the hand. In some alternate embodiments, each lower sleeve covers a different arm from the elbow to the fingertips and therefore covers the hand. The pants 530 are a wearable object that covers the body parts from the waist down, including the feet.

In some alternate embodiments, the costume 120(1) includes, without limitation, any combination of the right lower sleeve, the left lower sleeve, the pants 530, and/or any number of other wearable objects in any combination. For instance, in some alternate embodiments, the costume 120 (1) includes four wearable objects, the lower sleeve pair 520 and a pair of gloves. In other alternate embodiments, the costume 120(1) includes three wearable objects, the left lower sleeve, a right glove, and shorts (not shown). In yet other alternate embodiments, the costume 120(1) includes one wearable object, the pants 530.

Figure 6:
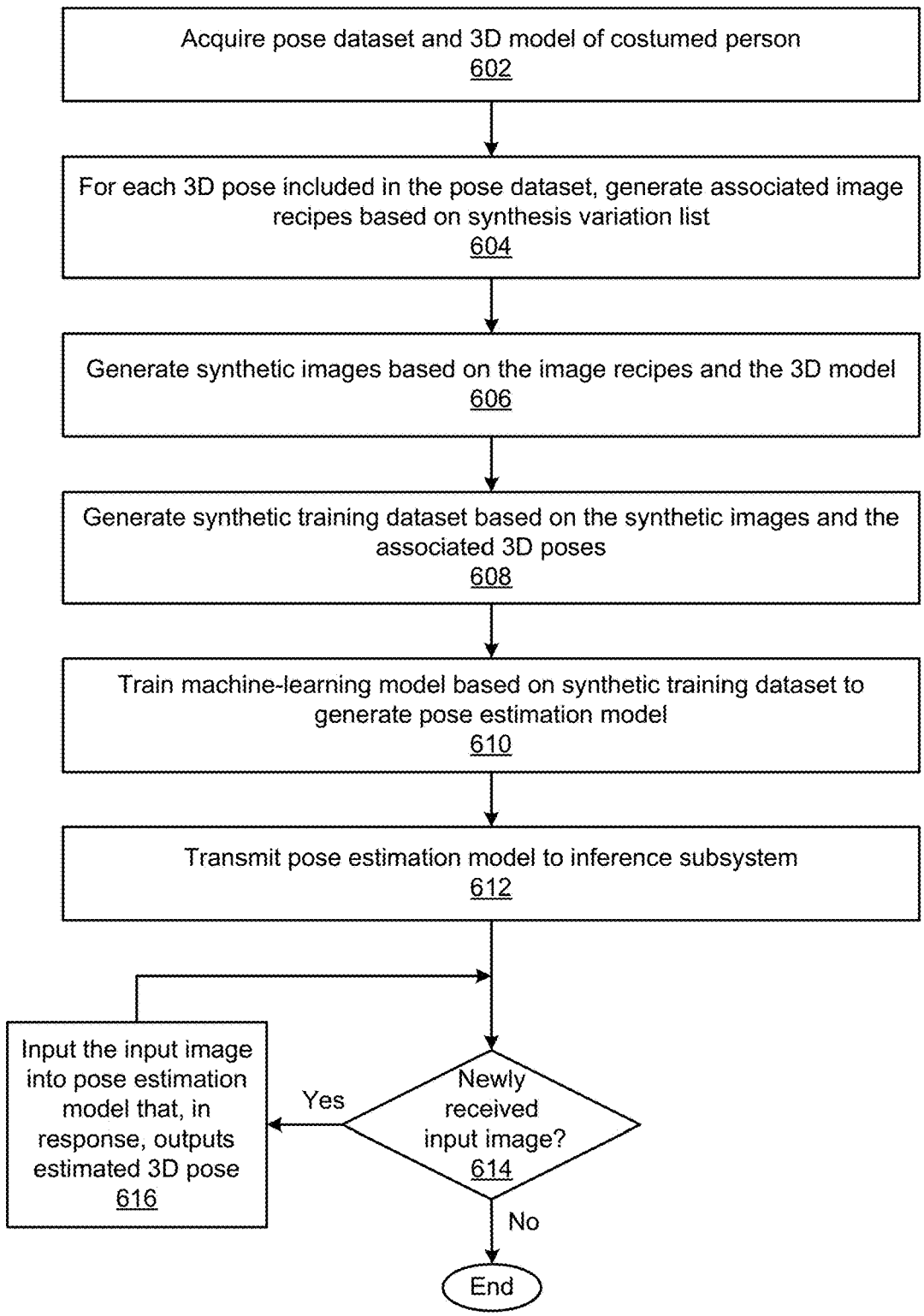
FIG. 6 is a flow diagram of method steps for estimating 3D poses of people from 2D images, according to various embodiments.

FIG. 6 is a flow diagram of method steps for estimating 3D poses of people from 2D images, according to various embodiments. Although the method steps are described with reference to the systems of FIGS. 1-5, persons skilled in the art will understand that any system configured to implement the method steps, in any order, falls within the scope of the present invention.

As shown, a method 600 begins a step 602, where the training application 140 acquires the pose dataset 130 and the 3D model 124 of the costumed person 122(1). At step 604, for each of the 3D poses 132 included in the pose dataset 130, the variation engine 240 generates any number of the image recipes 262 based on the synthesis variation list 134. At step 606, the synthesis/rendering engine 270 generates the synthetic images 278 based on the image recipes 262 and the 3D model 124.

At step 608, the synthesis/rendering engine 270 generates the synthetic training dataset 280 based on the synthetic images 278 and the associated 3D poses 132. At step 610, the training application 140 trains the machine-learning model 290 based on the synthetic training dataset 280 to generate the pose estimation model 160. At step 612, the training application 140 transmits the pose estimation model 160 to the inference subsystem 104.

At step 614, the inference subsystem 104 determines whether the inference subsystem 104 has newly received the input image 188 from the camera 180. If, at step 614, the inference subsystem 104 determines that the inference subsystem 104 has not newly received the input image 188 from the camera 180, then the method 600 terminates. If, however, at step 614, the inference subsystem 104 determines that the inference subsystem 104 has newly received the input image 188 from the camera 180, then the method 600 proceeds to step 616.

At step 616, the inference subsystem 104 inputs the input image 188 into the pose estimation model 160 and, in response, the pose estimation model 160 outputs the estimated 3D pose 190. The method 600 then returns to step 614, where the inference subsystem 104 determines whether the inference subsystem 104 has newly received the input image 188 from the camera 180. The method 600 continues to cycle through steps 614-616 until the inference subsystem 104 determines, at step 614, that the inference subsystem 104 has not newly received the input image 188 from the camera 180. The method 600 then terminates.

In sum, the disclosed techniques may be used to generate a pose estimation model that accurately estimates a 3D pose of a costumed person depicted in an image acquired by a single camera. The costumed person can be any person wearing a costume that visually differentiates between various body parts. In some embodiments, a training application generates the pose estimation model based on a 3D model of a person wearing the costume, any number of 3D poses, and a list of synthesis variations. The training application includes, without limitation, a variation engine, a synthesis/rendering engine, and a machine-learning model.

During a training phase, the variation engine generates multiple variants based on the list of synthesis variations. Each variant specifies a different combination of body changes, lighting, camera viewpoint, and texture. For each of the 3D poses, the variation engine generates multiple image recipes, where each image recipe specifies the 3D pose and a different variant. For each of the image recipes, the synthesis/rendering engine optionally modifies the 3D model as per any specified body changes and then fits the associated 3D pose to either the 3D model or the modified 3D model to generate a posed 3D model. For each of the image recipes, the synthesis/rendering engine renders the associated posed 3D model based on the specified lighting, camera viewport, and texture to generate a synthetic image. For each synthetic image, the synthesis/rendering engine generates a training item that includes the synthetic image and the associated 3D pose. Together, the training items form a synthetic training dataset. Subsequently, the training application trains the machine-learning model based on the synthetic training database to generate the pose estimation model.

At least one technical advantage of the disclosed techniques relative to the prior art is that the synthetic training dataset can be used to train a machine-learning model to accurately infer the orientations of people having a variety of different body types across different types of environments. In particular, because the pose estimation model can accurately determine the orientation of a costumed person based only on the costume, the total number of body parts that are flipped in the estimated 3D pose can be reduced relative to prior-art techniques. Furthermore, because the training application automatically varies the 3D poses, the shapes of the costumed persons, and the environmental conditions across the synthetic images, the machine-learning model learns to generalize when inferring 3D poses. Therefore, the resulting pose estimation model can accurately determine estimated 3D poses for input images depicting a wide range of people oriented in a variety of poses across different types of environments. For example, the pose estimation model could accurately infer the 3D poses of dozens or hundreds of persons on a beach. These technical advantages provide one or more technological improvements over prior art approaches 1. In some embodiments, a computer-implemented method for generating training items for three-dimensional (3D) pose estimation comprises generating a plurality of posed 3D models based on a plurality of 3D poses and a 3D model of a first person wearing a first costume associated with a plurality of visual attributes, for each posed 3D model, performing at least one rendering operation to generate at least one synthetic image, and for each synthetic image, generating a training item to include in a synthetic training dataset based on the synthetic image and a 3D pose associated with the posed 3D model from which the synthetic image was rendered, wherein the synthetic training dataset is tailored for training a machine-learning model to compute estimated 3D poses of persons from two-dimensional (2D) input images.

2. The computer-implemented method of clause 1, wherein each visual attribute included in the plurality of visual attributes comprises a color, a pattern, or a texture.

3. The computer-implemented method of clauses 1 or 2, wherein the plurality of visual attributes differentiates between one or more body parts of the first person.

4. The computer-implemented method of any of clauses 1-3, wherein the first costume comprises at least one of a full suit, pants, an arm band, or a lower sleeve.

5. The computer-implemented method of any of clauses 1-4, wherein generating the plurality of posed 3D models comprises, for a first 3D pose included in the plurality of 3D poses, fitting the 3D model of the first person wearing the first costume to the first 3D pose to generate a first posed 3D model.

6. The computer-implemented method of any of clauses 1-5, wherein generating the plurality of posed 3D models comprises, for a first 3D pose included in the plurality of 3D poses modifying at least one shape associated with the 3D model of the first person wearing the first costume to generate a modified 3D model, and fitting the modified 3D model to the first 3D pose to generate a second posed 3D model.

7. The computer-implemented method of any of clauses 1-6, wherein, for a first posed 3D model, performing the at least one rendering operation comprises rendering the first posed 3D model based on first environmental data to generate a first synthetic image, and rendering the first posed 3D model based on second environmental data to generate a second synthetic image.

8. The computer-implemented method of any of clauses 1-7, wherein the machine-learning model comprises a convolutional neural network.

9. The computer-implemented method of any of clauses 1-8, further comprising performing at least one training operation on the machine-learning model based on the synthetic training dataset to generate a trained machine-learning model.

10. The computer-implemented method of any of clauses 1-9, further comprising inputting a 2D input image that depicts a second person wearing a second costume associated with the plurality of visual attributes into the trained machine-learning model to generate an estimated 3D pose of the second person.

11. In some embodiments, one or more non-transitory computer readable media include instructions that, when executed by one or more processors, cause the one or more processors to generate training items for three-dimensional (3D) pose estimation by performing the steps of generating a plurality of posed 3D models based on a plurality of 3D poses and a 3D model of a first person wearing a first costume associated with a plurality of visual attributes, for each posed 3D model, performing at least one rendering operation to generate at least one synthetic image, and for each synthetic image, generating a training item to include in a synthetic training dataset based on the synthetic image and a 3D pose associated with the posed 3D model from which the synthetic image was rendered, wherein the synthetic training dataset is tailored for training a machine-learning model to compute estimated 3D poses of persons from two-dimensional (2D) input images.

12. The one or more non-transitory computer readable media of clause 11, wherein each visual attribute included in the plurality of visual attributes comprises a color, a pattern, or a texture.

13. The one or more non-transitory computer readable media of clauses 11 or 12, wherein the plurality of visual attributes differentiates between at least two of a portion of the left arm of the first person, a portion of the right arm of the first person, a portion of the chest of the first person, or a portion of the back of the first person.

14. The one or more non-transitory computer readable media of any of clauses 11-13, wherein the first costume comprises at least one of a full suit, pants, an arm band, or a lower sleeve.

15. The one or more non-transitory computer readable media of any of clauses 11-14, wherein generating the plurality of posed 3D models comprises, for a first 3D pose included in the plurality of 3D poses modifying at least one shape associated with the 3D model of the first person wearing the first costume to generate a modified 3D model, and fitting the modified 3D model to the first 3D pose to generate a second posed 3D model.

16. The one or more non-transitory computer readable media of any of clauses 11-15, wherein, for a first posed 3D model, performing the at least one rendering operation comprises rendering the first posed 3D model based on first environmental data to generate a first synthetic image, and rendering the first posed 3D model based on second environmental data to generate a second synthetic image.

17. The one or more non-transitory computer readable media of any of clauses 11-16, wherein the first environmental data is associated with at least one of a lighting, a camera viewpoint, or a texture.

18. The one or more non-transitory computer readable media of any of clauses 11-17, further comprising performing at least one training operation on the machine-learning model based on the synthetic training dataset to generate a trained machine-learning model.

19. The one or more non-transitory computer readable media of any of clauses 11-18, further comprising inputting a 2D input image that depicts a second person wearing a second costume associated with the plurality of visual attributes into the trained machine-learning model to generate an estimated 3D pose of the second person, wherein the 2D input image comprises a frame of a video sequence acquired via a video camera or a red green blue image acquired via a still camera.

20. In some embodiments, a system comprises one or more memories storing instructions, and one or more processors coupled to the one or more memories that, when executing the instructions, perform the steps of generating a plurality of posed 3D models based on a plurality of 3D poses and a 3D model of a first person wearing a first costume associated with a plurality of visual attributes, for each posed 3D model, performing at least one rendering operation to generate at least one synthetic image, and for each synthetic image, generating a training item to include in a synthetic training dataset based on the synthetic image and a 3D pose associated with the posed 3D model from which the synthetic image was rendered, wherein the synthetic training dataset is tailored for training a machine-learning model to compute estimated 3D poses of persons from two-dimensional (2D) input images.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program codec embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating training items for three-dimensional (3D) pose estimation, the method comprising:
generating a plurality of posed 3D models based on a plurality of 3D poses and a 3D model of a first person wearing a first costume associated with a plurality of visual attributes, wherein generating the plurality of posed 3D models comprises, for a first 3D pose included in the plurality of 3D poses:
modifying at least one shape associated with the 3D model of the first person wearing the first costume to generate a modified 3D model, and
fitting the modified 3D model to the first 3D pose to generate a first posed 3D model;
for each posed 3D model, performing at least one rendering operation to generate at least one synthetic image; and
for each synthetic image, generating a training item to include in a synthetic training dataset, wherein the training item includes the synthetic image and a 3D pose associated with a posed 3D model included in the plurality of posed 3D models from which the synthetic image was rendered, and wherein the synthetic training dataset is tailored for training a machine-learning model to compute estimated 3D poses of persons from two-dimensional (2D) input images.

2. The computer-implemented method of claim 1, wherein each visual attribute included in the plurality of visual attributes comprises a color, a pattern, or a texture.

3. The computer-implemented method of claim 1, wherein the plurality of visual attributes differentiates between one or more body parts of the first person.

4. The computer-implemented method of claim 1, wherein the first costume comprises at least one of a full suit, pants, an arm band, or a lower sleeve.

5. The computer-implemented method of claim 1, wherein generating the plurality of posed 3D models comprises, for a second 3D pose included in the plurality of 3D poses, fitting the 3D model of the first person wearing the first costume to the second 3D pose to generate a second posed 3D model.

6. The computer-implemented method of claim 1, wherein, for a first posed 3D model, performing the at least one rendering operation comprises:
rendering the first posed 3D model based on first environmental data to generate a first synthetic image; and
rendering the first posed 3D model based on second environmental data to generate a second synthetic image.

7. The computer-implemented method of claim 1, wherein the machine-learning model comprises a convolutional neural network.

8. The computer-implemented method of claim 1, further comprising performing at least one training operation on the machine-learning model based on the synthetic training dataset to generate a trained machine-learning model.

9. The computer-implemented method of claim 8, further comprising inputting a 2D input image that depicts a second person wearing a second costume associated with the plurality of visual attributes into the trained machine-learning model to generate an estimated 3D pose of the second person.

10. One or more non-transitory computer readable media including instructions that, when executed by one or more processors, cause the one or more processors to generate training items for three-dimensional (3D) pose estimation by performing the steps of:
generating a plurality of posed 3D models based on a plurality of 3D poses and a 3D model of a first person wearing a first costume associated with a plurality of visual attributes, wherein generating the plurality of posed 3D models comprises, for a first 3D pose included in the plurality of 3D poses:
modifying at least one shape associated with the 3D model of the first person wearing the first costume to generate a modified 3D model, and
fitting the modified 3D model to the first 3D pose to generate a first posed 3D model;
for each posed 3D model, performing at least one rendering operation to generate at least one synthetic image; and
for each synthetic image, generating a training item to include in a synthetic training dataset, wherein the training item includes the synthetic image and a 3D pose associated with a posed 3D model included in the plurality of posed 3D models from which the synthetic image was rendered, and wherein the synthetic training dataset is tailored for training a machine-learning model to compute estimated 3D poses of persons from two-dimensional (2D) input images.

11. The one or more non-transitory computer readable media of claim 10, wherein each visual attribute included in the plurality of visual attributes comprises a color, a pattern, or a texture.

12. The one or more non-transitory computer readable media of claim 11, wherein the plurality of visual attributes differentiates between at least two of a portion of a left arm of the first person, a portion of a right arm of the first person, a portion of a chest of the first person, or a portion of a back of the first person.

13. The one or more non-transitory computer readable media of claim 10, wherein the first costume comprises at least one of a full suit, pants, an arm band, or a lower sleeve.

14. The one or more non-transitory computer readable media of claim 10, wherein, for a first posed 3D model, performing the at least one rendering operation comprises:
rendering the first posed 3D model based on first environmental data to generate a first synthetic image; and
rendering the first posed 3D model based on second environmental data to generate a second synthetic image.

15. The one or more non-transitory computer readable media of claim 14, wherein the first environmental data is associated with at least one of a lighting, a camera viewpoint, or a texture.

16. The one or more non-transitory computer readable media of claim 10, wherein the instructions, when executed by one or more processors, further cause the one or more processors to perform at least one training operation on the machine-learning model based on the synthetic training dataset to generate a trained machine-learning model.

17. The one or more non-transitory computer readable media of claim 16, wherein the instructions, when executed by one or more processors, further cause the one or more processors to input a 2D input image that depicts a second person wearing a second costume associated with the plurality of visual attributes into the trained machine-learning model to generate an estimated 3D pose of the second person, wherein the 2D input image comprises a frame of a video sequence acquired via a video camera or a red green blue image acquired via a still camera.

18. A system comprising:
one or more memories storing instructions; and
one or more processors coupled to the one or more memories that, when executing the instructions, perform the steps of:
generating a plurality of posed 3D models based on a plurality of 3D poses and a 3D model of a first person wearing a first costume associated with a plurality of visual attributes, wherein generating the plurality of posed 3D models comprises, for a first 3D pose included in the plurality of 3D poses:
modifying at least one shape associated with the 3D model of the first person wearing the first costume to generate a modified 3D model; and
fitting the modified 3D model to the first 3D pose to generate a first posed 3D model,
for each posed 3D model, performing at least one rendering operation to generate at least one synthetic image, and
for each synthetic image, generating a training item to include in a synthetic training dataset, wherein the training item includes the synthetic image and a 3D pose associated with a posed 3D model included in the plurality of posed 3D models from which the synthetic image was rendered, and wherein the synthetic training dataset is tailored for training a machine-learning model to compute estimated 3D poses of persons from two-dimensional (2D) input images.

* * * * *